US012643535B2

(12) United States Patent
Park

(10) Patent No.: US 12,643,535 B2
(45) Date of Patent: Jun. 2, 2026

(54) PARKING CONTROL DEVICE AND METHOD THEREOF

(71) Applicants: HYUNDAI MOTOR COMPANY, Seoul (KR); KIA CORPORATION, Seoul (KR)

(72) Inventor: Jong Ho Park, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 214 days.

(21) Appl. No.: 18/523,166

(22) Filed: Nov. 29, 2023

(65) Prior Publication Data

US 2024/0199003 A1 Jun. 20, 2024

(30) Foreign Application Priority Data

Dec. 16, 2022 (KR) ......................... 10-2022-0177256

(51) Int. Cl.
| | |
|---|---|
| *B60W 30/06* | (2006.01) |
| *G06V 10/44* | (2022.01) |
| *G06V 20/58* | (2022.01) |
| *G06V 20/62* | (2022.01) |

(52) U.S. Cl.
CPC .............. *B60W 30/06* (2013.01); *G06V 10/44* (2022.01); *G06V 20/586* (2022.01); *G06V 20/625* (2022.01); *B60W 2420/403* (2013.01); *B60W 2552/53* (2020.02); *B60W 2554/20* (2020.02); *G06V 2201/08* (2022.01)

(58) Field of Classification Search
CPC ........... B60W 30/06; B60W 2420/403; B60W 2552/53; B60W 2554/20; B60W 50/14; B60W 60/0025; B60W 2050/146; B60W 2420/40; B60W 40/02; G06V 10/44; G06V 20/586; G06V 20/625; G06V 2201/08; G06V 10/46; G06T 7/13; B60Y 2300/06
See application file for complete search history.

(56) References Cited

U.S. PATENT DOCUMENTS

| | | | |
|---|---|---|---|
| 2019/0291722 A1* | 9/2019 | Maeda | .................. B60W 10/18 |
| 2022/0073056 A1* | 3/2022 | Hüger | ................. G06V 20/586 |

* cited by examiner

*Primary Examiner* — Daryl C Pope
(74) *Attorney, Agent, or Firm* — Morgan Lewis & Bockius LLP

(57) ABSTRACT

A method of controlling parking of a vehicle provided with a parking control device including a processor includes: under the control of the processor, obtaining first contour information from a first parked vehicle which is parked in a parking space using sensor information obtained via a sensor module provided in the vehicle; identifying a plurality of parking types for the first parked vehicle based on the first contour information and a current traveling direction of the vehicle; estimating a size of the first parked vehicle in response to a parking type selected among the plurality of parking types; and exploring a target parking space in the parking space based on the size of the first parked vehicle.

20 Claims, 10 Drawing Sheets

24

Second parked vehicle (20)

23

22

21

16

15

12

First parked vehicle (10)

13

14    11

10a

200

—————— : Visible area (11, 21)

⋯⋯⋯⋯ : Invisible area (12, 22)

▒▒▒ : Estimated vehicle sizes/directions (13, 23)

— ·· — ·· : Actual first and second vehicle sizes/directions (14, 24)

▨▨▨ : Estimated parking space (15)

— · — · : Actual parking space (16)

ego vehicle

PARKING CONTROL DEVICE AND METHOD THEREOF

CROSS-REFERENCE TO RELATED APPLICATION

The present application claims priority to Korean Patent Application No. 10-2022-0177256, filed on Dec. 16, 2022, the entire contents of which is incorporated herein for all purposes by this reference.

BACKGROUND OF THE PRESENT DISCLOSURE

Field of the Present Disclosure

The present disclosure relates to a parking control device and a method thereof.

Description of Related Art

Typical autonomous vehicles use ultrasonic sensors, cameras, and LiDAR to explore parking spaces.

The ultrasonic sensors may not a have relatively high accuracy of parking space recognition due to their characteristics, and the cameras may not have a relatively high accuracy of parking space recognition due to ground clearance error due to the mounting position.

Meanwhile, the LiDAR is used to supplement the accuracy in parking space recognition of the ultrasonic sensors and the cameras to explore parking spaces, but sensors including the LiDAR may not accurately detect invisible areas.

For example, an autonomous vehicle may estimate the size/direction of a parked vehicle only using values input from sensors.

Furthermore, when exploring a parking space from a distance, such an estimation of the size/direction of a vehicle may be inaccurate because a visible area of a target vehicle is small.

Due to the inaccurate estimation of the size/direction of the target vehicle, the size/direction of a parking space may also be inaccurate, which may increase the number of parking control steps and degrade marketability.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a parking control device and method which may reduce the number of parking control steps by accurately recognizing the size of a target vehicle and the parking direction of the target vehicle using a Light Detection and Ranging (LiDAR) sensor and accurately determining the size of a parking space.

The technical issues to be solved by the present disclosure are not limited to the ones described above, but other technical issues not described herein are clearly understood by one of ordinary skill in the art from the following description.

According to an aspect of the present disclosure, there is provided a method of controlling parking of a vehicle provided with a parking control device including a processor, the method including: under the control of the processor, obtaining first contour information of a first parked vehicle which is parked in a parking space, using sensor information obtained via a sensor module provided in the ego vehicle: identifying a plurality of parking types for the first parked vehicle based on the first contour information and a current traveling direction of the ego vehicle: estimating a size of the first parked vehicle in response to a parking type selected among the plurality of parking types: and exploring a target parking space in the parking space based on the size of the first parked vehicle.

Furthermore, the method may include: under the control of the processor, obtaining second contour information of a second parked vehicle which is parked apart from the first parked vehicle: identifying a plurality of parking types for the second parked vehicle based on the second contour information and the current traveling direction of the ego vehicle; estimating a size of the second parked vehicle in response to a parking type selected among the plurality of parking types for the second parked vehicle: and exploring the target parking space in the parking space based on the size of the first parked vehicle and the size of the second parked vehicle.

Furthermore, the method may include: under the control of the processor, when a portion of the second contour information is not obtained for a second parked vehicle which is parked apart from the first parked vehicle, estimating the size of the second parked vehicle based on the first contour information and the parking type selected among the plurality of parking types for the first parked vehicle: and exploring the target parking space in the parking space based on the size of the first parked vehicle and the size of the second parked vehicle.

Furthermore, the first contour information may include: a first linear segment extracted based on a side of the first parked vehicle: a first corner point which is closest to the ego vehicle among corners of the first parked vehicle: a tilt of the first parked vehicle, which is an angle formed between the first linear segment and the current traveling direction of the ego vehicle: and a center point of the first parked vehicle extracted through a first line perpendicular to the first linear segment.

Furthermore, the method may include: under the control of the processor, extracting a plurality of points becoming in contact with the first line by moving the first line to an outermost line of the first parked vehicle, and setting a centrally positioned point among the extracted plurality of points as the center point of the first parked vehicle.

Furthermore, the method may include: under the control of the processor, determining an overall width of the first parked vehicle, using the first corner point and the center point of the first parked vehicle.

Furthermore, the method may include: under the control of the processor, when the determined overall width of the first parked vehicle is out of a preset reference overall width range, extracting a license plate of the first parked vehicle from the sensor information, and determining the center point of the first parked vehicle using the extracted license plate of the first parked vehicle: and re-determining the overall width of the first parked vehicle based on the determined center point of the first parked vehicle and the first corner point.

Furthermore, the method may include: under the control of the processor, when the determined overall width of the first parked vehicle is out of the preset reference overall width range, extracting a parking space marking line of the parking space from the sensor information, and determining the center point of the first parked vehicle using the extracted parking space marking line: and re-determining the overall width of the first parked vehicle based on the determined center point of the first parked vehicle and the first corner point.

Furthermore, the method may include: under the control of the processor, when the center point of the first parked vehicle is not extracted, determining an overall length of the first parked vehicle using the first linear segment: and estimating the overall width of the first parked vehicle by applying the determined overall length of the first parked vehicle to a preset ratio of overall width versus overall length.

Furthermore, the target parking space may be explored based on the first parked vehicle or the second parked vehicle which is parked in proximity to the target parking space, and the method may include: under the control of the processor, determining a length and a width of the target parking space based on the first contour information or the second contour information obtained from the second parked vehicle.

According to another aspect of the present disclosure, there is provided a parking control device, provided in a vehicle and configured to control parking of the ego vehicle, the parking control device including: a processor configured to control the parking control device, wherein the processor is configured to: obtain first contour information of a first parked vehicle which is parked in a parking space, using sensor information obtained via a sensor module provided in the ego vehicle: identify a plurality of parking types for the first parked vehicle based on the first contour information and a current traveling direction of the ego vehicle: estimate a size of the first parked vehicle in response to a parking type selected among the plurality of parking types: and explore a target parking space in the parking space based on the size of the first parked vehicle.

Furthermore, the processor may be configured to: obtain second contour information of a second parked vehicle which is parked apart from the first parked vehicle; identify a plurality of parking types for the second parked vehicle based on the second contour information and the current traveling direction of the ego vehicle: estimate a size of the second parked vehicle in response to a parking type selected among the plurality of parking types for the second parked vehicle: and explore the target parking space in the parking space based on the size of the first parked vehicle and the size of the second parked vehicle.

Furthermore, the processor may be configured to: when a portion of the second contour information is not obtained for a second parked vehicle which is parked apart from the first parked vehicle, estimate the size of the second parked vehicle based on the first contour information and the parking type selected among the plurality of parking types for the first parked vehicle: and explore the target parking space in the parking space based on the size of the first parked vehicle and the size of the second parked vehicle.

Furthermore, the first contour information may include: a first linear segment extracted based on a side of the first parked vehicle: a first corner point which is closest to the ego vehicle among corners of the first parked vehicle: a tilt of the first parked vehicle, which is an angle formed between the first linear segment and the current traveling direction of the ego vehicle: and a center point of the first parked vehicle extracted through a first line perpendicular to the first linear segment.

Furthermore, the processor may be configured to: extract a plurality of points becoming in contact with the first line by moving the first line to an outermost line of the first parked vehicle, and set a centrally positioned point among the extracted plurality of points as the center point of the first parked vehicle.

Furthermore, the processor may be configured to: determine an overall width of the first parked vehicle, using the first corner point and the center point of the first parked vehicle.

Furthermore, the processor may be configured to: when the determined overall width of the first parked vehicle is out of a preset reference overall width range, extract a license plate of the first parked vehicle from the sensor information, and determine the center point of the first parked vehicle using the extracted license plate of the first parked vehicle: and re-determine the overall width of the first parked vehicle based on the determined center point of the first parked vehicle and the first corner point.

Furthermore, the processor may be configured to: when the determined overall width of the first parked vehicle is out of the preset reference overall width range, extract a parking space marking line of the parking space from the sensor information, and determine the center point of the first parked vehicle using the extracted parking space marking line: and re-determine the overall width of the first parked vehicle based on the determined center point of the first parked vehicle and the first corner point.

Furthermore, the processor may be configured to: when the center point of the first parked vehicle is not extracted, determine an overall length of the first parked vehicle using the first linear segment: and estimate the overall width of the first parked vehicle by applying the determined overall length of the first parked vehicle to a preset ratio of overall width versus overall length.

Furthermore, the target parking space may be explored based on the first parked vehicle or the second parked vehicle which is parked in proximity to the target parking space, wherein the processor may be configured to: control to determine a length and a width of the target parking space based on the first contour information or the second contour information obtained from the second parked vehicle.

According to various embodiments of the present disclosure described herein, a parking control device and method may improve the accuracy of the size of a parking space by accurately recognizing the size and the parking direction of a target vehicle, and the like, using a LiDAR sensor.

Furthermore, the parking control device and method may reduce the number of parking control steps by accurately recognizing the size and the parking direction of the target vehicle using the LiDAR sensor and accurately determining the size of the parking space.

Furthermore, the parking control device and method may improve the marketability of an autonomous vehicle by accurately determining the size and the parking direction of the target vehicle, and the size of the parking space, using the LiDAR sensor and thereby reducing the number of parking control steps.

Furthermore, the parking control device and method may improve the reliability of the autonomous vehicle by accurately determining the size and the parking direction of the target vehicle, and the size of the parking space, using the LiDAR sensor and thereby reducing the number of parking control steps.

The effects to be obtained from the present disclosure are not limited to those described above, and other effects not described herein will be apparent to one of ordinary skill in the art to which the present disclosure pertains from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
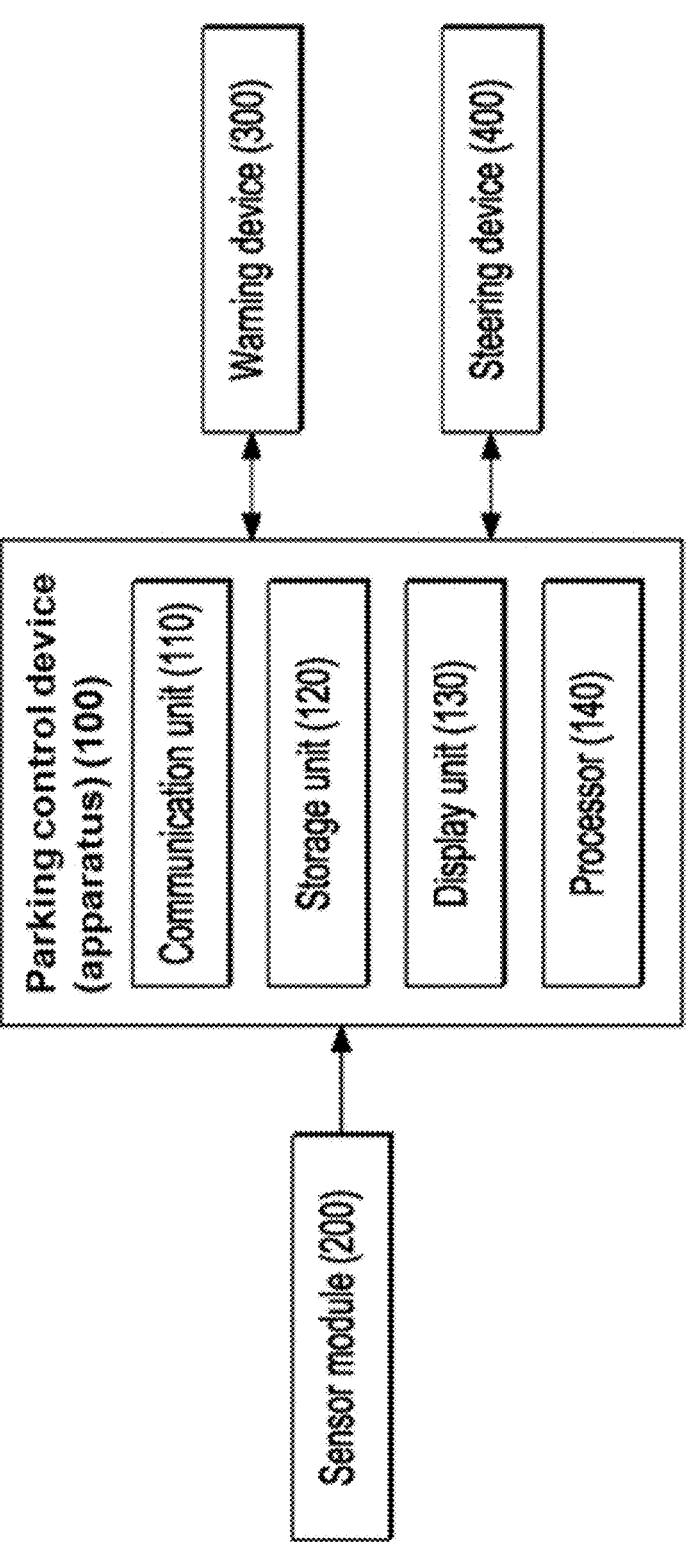
FIG. 1 is a block diagram illustrating a configuration of a vehicle including a parking control device, according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the accompanying drawings, and the same or similar elements will be provided the same reference numerals regardless of reference symbols, and redundant descriptions thereof will be omitted. In the following description, the terms "part/portion," "module," "unit," and "device/apparatus" may be implemented in software or hardware, and in various exemplary embodiments of the present disclosure, a plurality of these may be implemented as a single component, or a single "part/portion," "module," "unit," or "device/apparatus" may include a plurality of components.

Throughout the specification, when an element is referred to as being "coupled" or "connected" to another element, the element may be directly coupled or connected to the other element. However, it may also be indirectly connected thereto, and such an indirect connection includes a connection via a wireless communication network.

It will be understood that when an element "includes/comprises" another element or component, the element does not preclude the presence or addition of another element or component but may further include another element or component, unless otherwise defined.

Terms including ordinal numbers, such as "first," "second," and the like, may be used herein to distinguish an element from another, but elements or components described are not limited by these terms.

A singular expression includes the plural form unless the context clearly dictates otherwise.

The reference numerals or identification numbers of steps are not used to describe the order of the steps but are used for the convenience of description only, and the steps may be performed in different order other than specified herein unless the context clearly dictates otherwise.

FIG. 1 is a block diagram illustrating a configuration of a vehicle including a parking control device, according to an exemplary embodiment of the present disclosure.

Referring to FIG. 1, a vehicle according to an exemplary embodiment of the present disclosure may include a parking control device 100, a sensor module 200, a warning device 300, and a steering device 400. The vehicle described herein may be an autonomous vehicle. The autonomous vehicle may be sufficiently inferred from the Description of Related Art, and thus a detailed description thereof will be omitted here.

After entering a parking space, the parking control device 100 may obtain contour information associated with at least one parked vehicle in the parking space using sensor information obtained via the sensor module 200. For example, the parking control device 100 may obtain first contour information from a first parked vehicle (e.g., a first parked vehicle 10, see FIG. 2) which is parked in the parking space and second contour information from a second parked vehicle (e.g., a second parked vehicle 20, see FIG. 2) which is parked a predetermined distance apart from the first parked vehicle (e.g., 10, see FIG. 2), using the sensor information obtained via the sensor module 200 provided in the vehicle.

The parking control device 100 may identify a parking type of the first parked vehicle (e.g., 10, see FIG. 2) and/or the second parked vehicle (e.g., 20, see FIG. 2) based on the obtained first contour information and/or second contour information and a current traveling direction of the vehicle. The parking control device 100 may estimate a size of a parked vehicle corresponding to the identified parking type and explore a parking space based on the estimated size of the parked vehicle.

Figure 2:
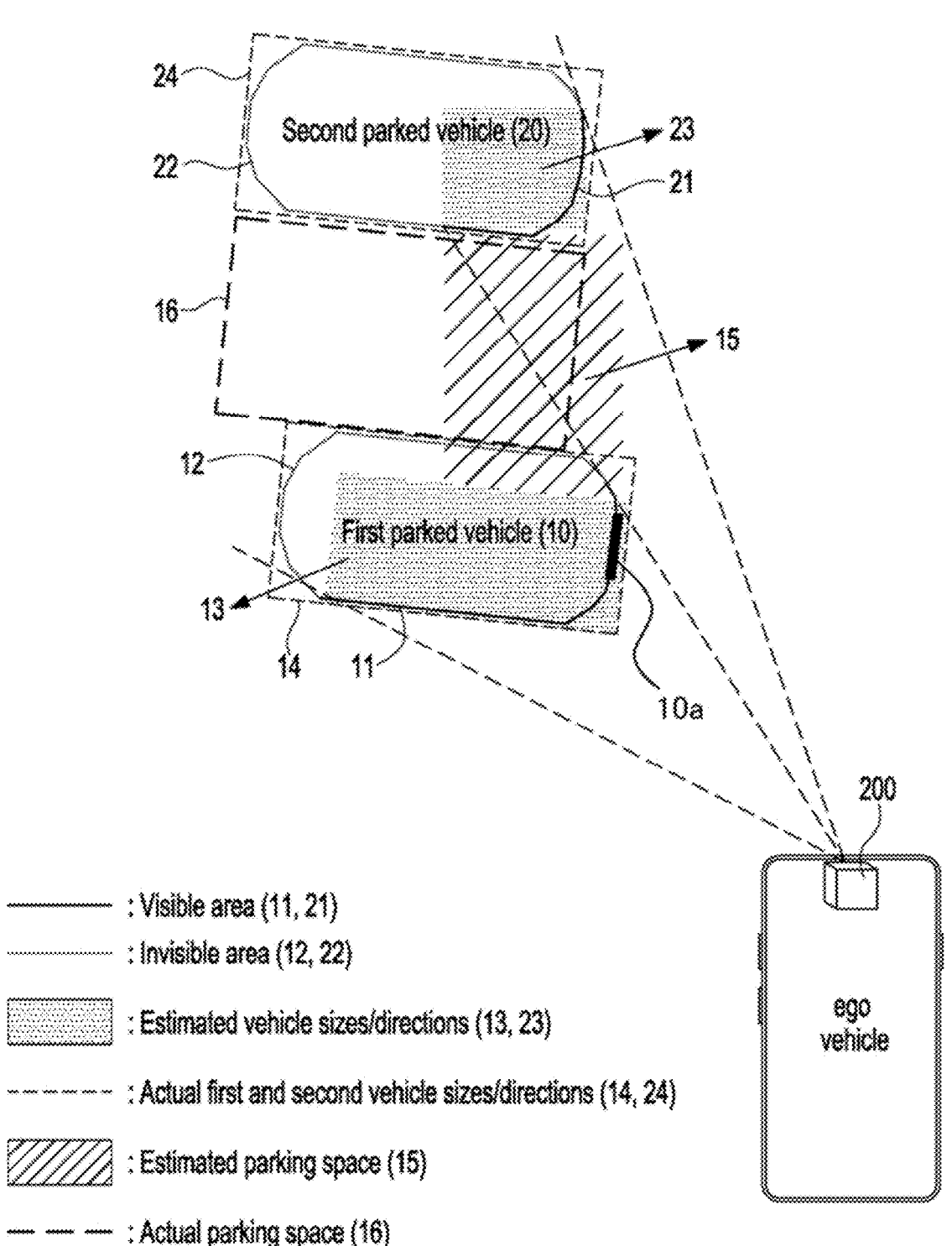
FIG. 2 is a diagram illustrating an example of detecting a plurality of parked vehicles using a parking control device, according to an exemplary embodiment of the present disclosure.
Figure 3:
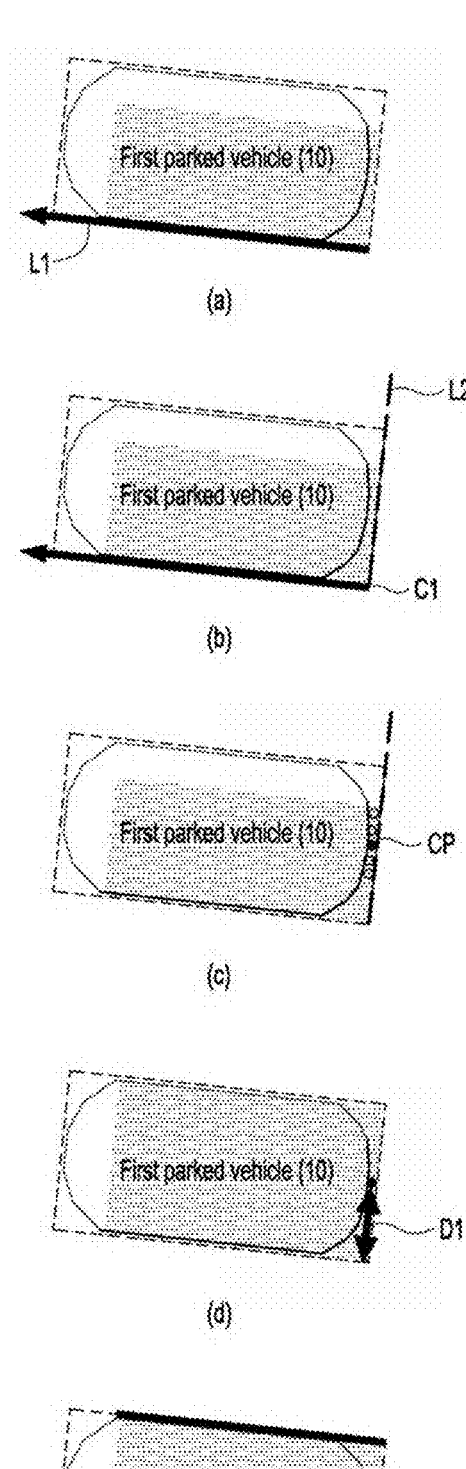
FIG. 3A, FIG. 3B, FIG. 3C, FIG. 3D, and FIG. 3E are diagrams illustrating a parking control method according to an exemplary embodiment of the present disclosure.

The at least one parked vehicle described herein may include the first parked vehicle (e.g., 10, see FIG. 2) and the second parked vehicle (e.g., 20, see FIG. 2). The first parked vehicle (e.g., 10, see FIG. 2) may also be referred to as a first object, and the second parked vehicle (e.g., 20, see FIG. 2) may also be referred to as a second object.

The parking control device 100 may be configured to determine a target parking space among explored parking spaces, generate a parking trajectory to park the vehicle in the target parking space, and perform parking control on the vehicle based on the parking trajectory.

The parking control device 100 may include a communication unit 110, a non-transitory storage unit 120, a display unit 130, and a processor 140.

The communication unit 110, which is a hardware device implemented with various electronic circuits to transmit and receive signals via wireless or wired connections, may perform in-vehicle communication via Controller Area Network (CAN) communication, Local Interconnect Network (LIN) communication, and the like, and communicate with the sensor module 200, the warning device 300, and the steering device 400.

The storage unit 120 may store detecting results from the sensor module 200 and information obtained by the processor 140. The storage unit 120 may include a storage medium of at least one of types including, for example, a flash memory type, a hard disk type, a micro type, a card type (e.g., a secure digital (SD) card or an eXtream digital (XD) card), a random-access memory (RAM) type, a static RAM (SRAM) type, a read-only memory (ROM) type, a programmable (PROM) type, an electrically erasable PROM (EEPROM) type, a magnetic RAM (MRAM) type, a magnetic disk, and an optical disk type.

The display unit 130 may display in real time a surrounding environment of the vehicle after entering a parking space, under the control of the processor 140. For example, the display unit 130 may display an image including an image of a parking space, an image of the target parking space, an image of the first parked vehicle, an image of the second parked vehicle, an image of the vehicle (or an "ego vehicle" interchangeably described herein), and the like, under the control of the processor 140. The display unit 130 may also display images captured from various angles while the vehicle is being parked. For example, the display unit 130 may display an around-view image.

The display unit 130 described above may be implemented as a heads-up display (HUD), a cluster, an audio video navigation (AVN) system, and the like. Furthermore, it may receive a color input directly from a user through a user setting menu (USM) of the cluster. Furthermore, the display unit 130 may include at least one of a liquid-crystal display (LCD), a thin-film transistor (TFT) LCD (TFT LCD), a light-emitting diode (LED), an organic light-emitting diode (OLED), an active-matrix OLED (AMOLED), a flexible display, a bendable display, and a three-dimensional (3D) display. Some of these displays may be implemented as a transparent display, which is configured to be transparent or photo-transparent so that the outside is visible therefrom.

Furthermore, the display unit 130 may be provided as a touchscreen including a touch panel and may be used as an input device in addition to an output device.

The processor 140 may be electrically connected to the communication unit 110, the storage unit 120, the display unit 130, and the like, and may electrically control each component. The processor 140 may be an electrical circuit that executes software instructions to perform various data processing and computations described below.

Herein, in an exemplary embodiment of the present disclosure, the storage unit 120 and the processor 140 may be implemented as separate semiconductor circuits. Alternatively, the storage unit 120 and the processor 140 may be implemented as a single integrated semiconductor circuit. The processor may embody one or more processor(s).

The processor 140 may obtain contour information associated with at least one parked vehicle in a parking space, using sensor information obtained via the sensor module 200.

For example, the processor 140 may obtain first contour information from a first parked vehicle which is parked in the parking space or obtain second contour information from a second parked vehicle which is parked a predetermined distance apart from the first parked vehicle, using the sensor information obtained via the sensor module 200 provided in the ego vehicle.

The first contour information may include a first linear segment extracted based on a side of the first parked vehicle, a first corner point which is positioned closest to the ego vehicle among corners of the first parked vehicle, a tilt of the first parked vehicle which is an angle formed between the first linear segment and a current traveling direction of the ego vehicle, and a center point of the first parked vehicle which is extracted through a first line perpendicular to the first linear segment.

The second contour information may include a second linear segment extracted based on a side of the second parked vehicle, a second corner point which is positioned the closest to the ego vehicle among corners of the second parked vehicle, a tilt of the second parked vehicle which is an angle formed between the second linear segment and the current traveling direction of the ego vehicle, and a center point of the second parked vehicle which is extracted through a second line perpendicular to the second linear segment.

Based on the obtained contour information, the processor 140 may identify a parking type of the at least one parked vehicle and estimate the size of the parked vehicle in response to the identified parking type.

For example, the processor 140 may identify a plurality of parking types for the first parked vehicle based on the first contour information and the current traveling direction of the ego vehicle, and identify a plurality of parking types for the second parked vehicle based on the second contour information and the current traveling direction of the ego vehicle.

The plurality of parking types may include first to fourth parking types. The first parking type may be above −15 degrees (°) and below 15° with respect to zero (0°), the second parking type may be above −15° and below 15° with respect to 90°, the third parking type may be above −15° and below to 15° with respect to 45°, and the fourth parking type may be above −15° and below 15° with respect to 135°.

For example, the first parking type may also be referred to as a parallel parking type, the second parking type may also be referred to as a perpendicular parking type, the third parking type may also be referred to as a forward diagonal parking (or head-in angled parking) type, and the fourth parking type may also be referred to as a reverse diagonal parking (or back-in angled parking) type.

The processor 140 may set, as a hysteresis area, an angled area that does not correspond to the first to fourth parking types, i.e., an angled area which is empty between the angles. For example, when there is a previously detected result in the set hysteresis area, the processor 140 may maintain the result, and control to unknown when there is no previously detected result.

The processor 140 may explore a parking space based on the estimated size of the parked vehicle.

For example, the processor 140 may estimate the size of the first parked vehicle in response to one of the parking types, and may explore a target parking space while exploring the parking space based on the size of the first parked vehicle. The processor 140 may also estimate the size of the second parked vehicle in response to one of the parking types, and may explore a target parking space while exploring the parking space based on the size of the second parked vehicle.

The explored parking space may include a parking space between the first parked vehicle and the second parked vehicle, a space around the first parked vehicle, a space around the second parked vehicle, and the like, which will be further described below.

As described above, the processor 140 may obtain the second contour information of the second parked vehicle which is parked a predetermined distance apart from the first parked vehicle, and may identify the plurality of parking types for the second parked vehicle based on the second contour information and the current traveling direction of the ego vehicle. The processor 140 may estimate the size of the second parked vehicle in response to the selected one of the parking types, and explore the target parking space among parking spaces based on the size of the first parked vehicle and the size of the second parked vehicle.

As described above, the processor 140 may extract rough information related to a parking space, using the obtained first contour information or the obtained second contour information.

However, when a portion of the second contour information is not obtained for the second parked vehicle which is parked a predetermined distance apart from the first parked vehicle, the processor 140 may estimate the size of the second parked vehicle based on the first contour information and the parking type selected among the plurality of parking types of the first contour information and may explore or search for the target parking space among parking spaces based on the size of the first parked vehicle and the size of the second parked vehicle.

The target parking space may be explored or searched based on the first parked vehicle or the second parked vehicle which is parked in proximity to the target parking space.

The processor 140 may be configured for controlling to determine a length of the target parking space and a width of the target parking space based on the first contour information or the second contour information, which will be further described below.

The processor 140 described above may be configured for controlling to extract a plurality of points in contact with the first line by moving the first line to an outermost line of the first parked vehicle, and set a centrally positioned point among the extracted plurality of points as the center point of the first parked vehicle.

According to an exemplary embodiment of the present disclosure, determining and setting the center point of the first parked vehicle may achieve centimeter (cm)-level accuracy of a parking area. That is, when, in the parking area, an overall length of a parked vehicle is not fully visible, it is likely to detect a parked vehicle that deviates from an average, and determining the size of the parked vehicle based on this may make it difficult to estimate an accurate overall width of the parked vehicle. As a result, accurate exploration of a target parking space among parking spaces may be difficult.

Thus, according to an exemplary embodiment of the present disclosure, the center point of the first parked vehicle may be set to obtain an accurate target parking space.

Furthermore, when the determined overall width of the first parked vehicle is out of a preset reference overall width range, the processor 140 may be configured for controlling to extract a license plate 10a of the first parked vehicle 10 from the sensor information, determine the center point of the first parked vehicle 10 using the extracted license plate 10a of the first parked vehicle 10, and redetermine the overall width of the first parked vehicle 10 based on the determined center point of the first parked vehicle 10 and the first corner point.

Furthermore, when the determined overall width of the first parked vehicle is out of the preset reference overall width range, the processor 140 may be configured for controlling to extract a parking space marking line from the sensor information, determine the center point of the first parked vehicle using the extracted parking space marking line, and redetermine the overall width of the first parked vehicle based on the determined center point of the first parked vehicle and the first corner point.

The sensor module 200 may include a plurality of sensors to detect an object present outside the ego vehicle, and may obtain information related to a position of the object, a speed of the object, a traveling direction of the object, and/or a type of the object (e.g., vehicle, pedestrian, bicycle, or motorcycle). To the present end, the sensor module 200 may include, as non-limiting examples, an ultrasonic sensor, a radar, a camera, a laser scanner and/or a corner radar, a LiDAR, an acceleration sensor, a yaw rate sensor, a torque measurement sensor, and/or a wheel speed sensor.

For example, the sensor module 200 may include an ultrasonic sensor, a camera, and a LiDAR. The ultrasonic sensor, the cameras, and the LiDAR may be mounted on the front and rear of the ego vehicle and on the left and right sides of the ego vehicle to obtain various parking information. For example, the parking information may include contour information of a parked vehicle, an image for parking control, parking space exploration, and the like.

The warning device 300 may output a warning sound or activate headlights or emergency lights to perform warning, when the parking control device 100 determines a speed of a nearby vehicle, a risk of collision, and the like.

In an exemplary embodiment of the present disclosure, the warning device 300 may further include a speaker.

The steering device 400 may be controlled by the parking control device 100 to drive the steering of the ego vehicle for parking control.

FIG. 2 is a diagram illustrating an example of detecting a plurality of parked vehicles using a parking control device, according to an exemplary embodiment of the present disclosure.

A perpendicular parking type which is a second parking type among first to fourth parking types will be mainly described hereinafter with reference to FIG. 2.

Referring to FIG. 2, the sensor module 200 may be disposed at the front of a vehicle (or an ego vehicle herein). However, examples are not limited thereto. For example, a LiDAR may be mounted on the front, the rear, the left side, and the right side of the ego vehicle, to obtain various parking information.

The ego vehicle may detect a first parked vehicle 10 and a second parked vehicle 20 while currently traveling in a first direction in a parking space. Under the control of a parking control device (e.g., the parking control device 100, see FIG. 1), the ego vehicle may detect the first parked vehicle 10 and the second parked vehicle 20 through the sensor module 200 and obtain sensor information thereon.

The parking control device 100 may extract various parking information of the first parked vehicle 10 and the second parked vehicle 20 from the obtained sensor information.

For example, the various parking information extracted from the sensor information may be extracted based on the ego vehicle which is currently traveling in the first direction.

The various parking information may include an area 11 where the first parked vehicle 10 is visible, an area 12 where the first parked vehicle 10 is not visible, an area 21 where the second parked vehicle 20 is visible, an area 22 where the second parked vehicle 20 is not visible, sizes 13 and 23 to be estimated through these areas, and an estimated parking space 15.

As shown in FIG. 2, when the parking control device 100 determines the size 13 of the first parked vehicle 10 based on the area 11 extracted from the sensor information, a smaller size 14 than an actual size of the first parked vehicle 10 may be determined.

Furthermore, since the area 21 extracted from the sensor information is relatively smaller than the area 11, and thus, when the parking control device 100 determines the size 23 of the second parked vehicle 20 based on the area 21, the size 23 may be smaller than an actual size 24 of the second parked vehicle 20, and a direction of the second parked vehicle 20 may also be determined differently.

Accordingly, when the parking control device 100 estimates the parking space 15 based on the sizes of the first parked vehicle 10 and the second parked vehicle 20 that are differently determined from the actual sizes 14 and 24 of the first parked vehicle 10 and the second parked vehicle 20, the parking space 15 may be determined differently from an actual parking space 16.

To improve this, for accurate calculation of the size 14 of the first parked vehicle 10 and the size 24 of the second parked vehicle 20, control may be performed to extract the first contour information and the second contour information for the first parked vehicle 10 and the second parked vehicle 20, respectively, and identify a parking type for each of the first parked vehicle 10 and the second parked vehicle 20 based on the extracted first and second contour information and a current traveling direction of the ego vehicle.

As described above, according to an exemplary embodiment of the present disclosure, accurately determining the size 14 of the first parked vehicle 10 and the size 24 of the second parked vehicle 20 may contribute to an accurate exploration of a target parking space among parking spaces and stable parking control in the accurately explored target parking space.

FIG. 3A, FIG. 3B, FIG. 3C, FIG. 3D, and FIG. 3E are diagrams illustrating a parking control method according to an exemplary embodiment of the present disclosure.

A perpendicular parking type which is a second parking type among first to fourth parking types will be mainly described hereinafter with reference to FIG. 3A, FIG. 3B, FIG. 3C, FIG. 3D, and FIG. 3E.

A parking control method according to an exemplary embodiment of the present disclosure will be described below with reference to FIG. 3A, FIG. 3B, FIG. 3C, FIG. 3D, and FIG. 3E.

As shown in FIG. 3A, under the control of a processor, a parking control device may obtain first contour information of a first parked vehicle 10 which is parked in a parking space, using sensor information obtained via a sensor module provided in a vehicle.

For example, under the control of the processor, the parking control device may extract, from the first contour information, a first linear segment L1 extracted based on a side of the first parked vehicle 10, a first corner point C1 closest to the (ego) vehicle among corners of the first parked vehicle 10, and a tilt of the first parked vehicle 10 which is an angle formed between the first linear segment L1 and a current traveling direction of the ego vehicle.

The parking control device may identify a plurality of parking types for the first parked vehicle 10 based on the first contour information and the current traveling direction of the ego vehicle.

For example, the parking control device may identify the plurality of parking types for the first parked vehicle 10 based on the first linear segment L1, the first corner point C1, and the tilt of the first parked vehicle 10 that are extracted from the first contour information, and on the current traveling direction of the ego vehicle. For example, based on these, the parking control device may identify a parallel parking type, a perpendicular parking type, a forward diagonal parking type, and a reverse diagonal parking type for the first parked vehicle 10. The plurality of parking types has been described in detail above, and thus a more detailed description thereof will be omitted here.

The parking control device may then estimate the size of the first parked vehicle 10 in response to a parking type selected among the plurality of parking types, under the control of the processor.

For example, as shown in FIG. 3B and FIG. 3C, under the control of the processor, the parking control device may extract a first linear segment L1 and a center point CP of the first parked vehicle 10 from the first contour information. The center point CP of the first parked vehicle 10 may be extracted through a first line L2 perpendicular to the first linear segment L1.

For example, as shown in FIG. 3B and FIG. 3C, under the control of the processor, the parking control device may extract a first linear segment L1 which is a side of the first parked vehicle 10, move a first line L2 perpendicular to the first linear segment L1 to an outermost line of the first parked vehicle 10, extract a plurality of points in contact with the first line L2 moved along the first linear segment L1 to the outermost line of the first parked vehicle 10, and set, as a center point CP of the first parked vehicle 10, a point positioned at the center portion of the first parked vehicle 10 or a most protruding point.

As shown in FIG. 3D and FIG. 3E, under the control of the processor, the parking control device may be configured to determine an overall width of the first parked vehicle using the set center point CP of the first parked vehicle and the first corner point C1.

That is, as shown in FIG. 3D, under the control of the processor, the parking control device may be configured to determine a width direction distance D1 between the determined center point CP of the first parked vehicle 10 and the first corner point C1, and determine an overall width of the first parked vehicle 10.

For example, a typical vehicle width may be approximately 1.6 meters (m) to 2.0 m. Based on this, a reference overall width range may be set, in consideration of a predetermined marginal area of 0.8 m or greater and 1.0 m or less, which is half the typical vehicle width.

Under the control of the processor, the parking control device may be configured to determine whether the determined width direction distance D1 between the center point CP of the first parked vehicle 10 and the first corner point C1 is within the reference overall width range.

As shown in FIG. 3E, when it is determined that the determined width direction distance is within the reference overall width range, the parking control device may be configured to determine or set the overall width of the first parked vehicle 10 by symmetrically moving the first linear segment L1 relative to the center point CP of the first parked vehicle 10.

In contrast, when it is determined that the determined width direction distance is out of the reference overall width range, the parking control device may reset the center point CP of the first parked vehicle 10.

For example, when the determined width direction distance is out of the preset reference overall width range, the parking control device may extract a license plate 10a of a first parked vehicle 10 from the sensor information, and set or reset a center point of the first parked vehicle 10 using the extracted license plate 10a of the first parked vehicle 10, under the control of the processor.

Under the control of the processor, the parking control device may be configured to determine a width direction distance between the set or reset center point of the first parked vehicle and the first corner point, and may be configured to determine or redetermine the overall width of the first parked vehicle based on the distance.

Furthermore, when the determined width direction distance is out of the preset reference overall width range, the parking control device may extract a parking space marking line from the sensor information, and set or reset the center point of the first parked vehicle using the extracted parking space marking line, under the control of the processor. In the instant case, the parking space marking line may be extracted based on marking lines of a parking space on both sides of the first parked vehicle. In the instant case, the parking control device may be configured to determine a center point of the parking space marking line from the extracted parking space marking line, and set the determine center point of the parking space marking line as the center point of the first parked vehicle.

Under the control of the processor, the parking control device may be configured to determine a width direction distance between the set center point of the first parked vehicle and the first corner point, and determine or redetermine the overall width of the first parked vehicle based on the distance.

However, examples are not limited thereto, and when the determined width direction distance continues to be out of the preset reference overall width range, the parking control device may set the center point of the first parked vehicle using ultrasonic sensor information of the sensor information, and set the overall width of the first parked vehicle using the set center point of the first parked vehicle and the first corner point, under the control of the processor.

As described above, under the control of the processor, the parking control device may extract, determine, and symmetrize a first linear segment, a first corner point, a center point of the first parked vehicle, a tilt of the first parked vehicle, a width of the first parked vehicle, and the like to estimate the rear of the first parked vehicle which is not visible from the currently traveling vehicle, and may thus predict the size of the first parked vehicle.

Under the control of the processor, the parking control device may explore a target parking space among parking spaces based on the predicted size of the first parked vehicle.

Figure 4:
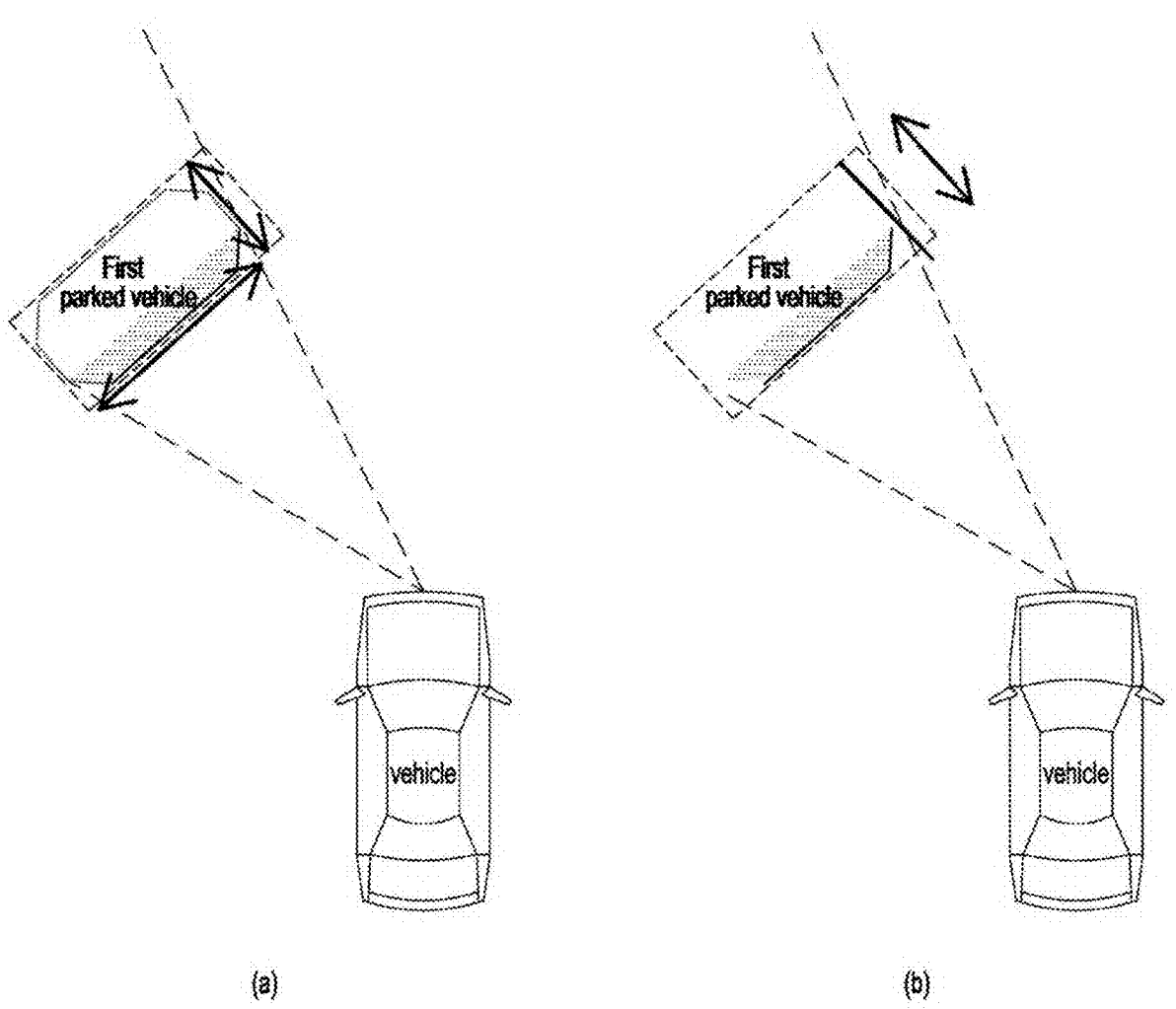
FIG. 4A and FIG. 4B are diagrams illustrating a parking control method according to another exemplary embodiment of the present disclosure.
Figure 5:
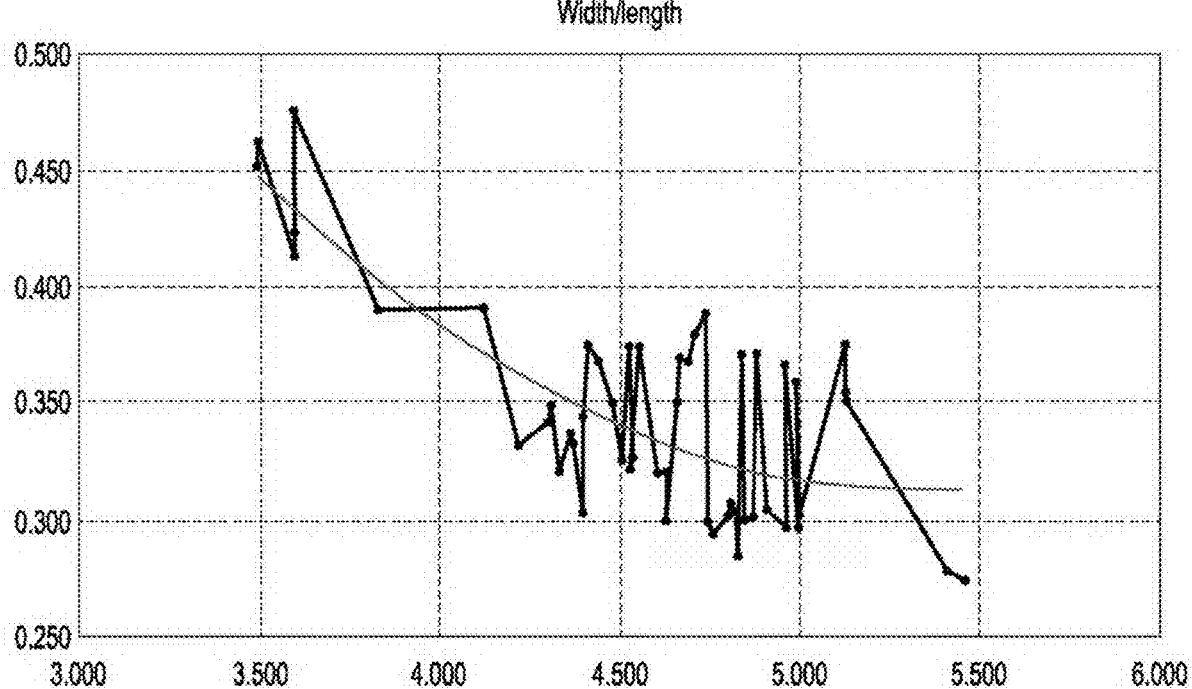
FIG. 5 is a diagram illustrating a trend line obtained by determining a width-length proportional relationship of a parked vehicle.

FIG. 4A and FIG. 4B are diagrams illustrating a parking control method according to another exemplary embodiment of the present disclosure. FIG. 5 is a diagram illustrating a trend line obtained by determining a width-length proportional relationship of a parked vehicle.

A reverse diagonal parking type which is a fourth parking type among first to fourth parking types will be mainly described below with reference to FIG. 4A and FIG. 4B. Referring to FIG. 3A, FIG. 3B, FIG. 3C, FIG. 3D, and FIG. 3E, a first parked vehicle is parked according to the second parking type and a center point of the first parked vehicle may be estimated. In contrast, when the first parked vehicle is parked according to the fourth parking type as shown in FIG. 4A and FIG. 4B, the center point of the first parked vehicle may not be readily estimated.

A parking control device according to another exemplary embodiment of the present disclosure may operate as follows. What has been described above with reference to FIG. 3A, FIG. 3B, FIG. 3C, FIG. 3D, and FIG. 3E will be omitted from the following description provided below with reference to FIG. 4A and FIG. 4B.

When it is not possible to extract the center point of the first parked vehicle, the parking control device may be configured to determine an overall length of the first parked vehicle using a first linear segment, under the control of a processor.

As shown in FIG. 4A, when the first parked vehicle is parked according to the reverse diagonal parking type which is the fourth parking type, the parking control device may readily recognize or determine the overall length of the first parked vehicle due to a characteristic of a difference in a heading angle with an ego vehicle.

As shown in FIG. 4B, under the control of the processor, the parking control device may estimate an overall width of the first parked vehicle by applying the determined overall length of the first parked vehicle to a preset ratio of overall width versus overall length.

When the overall length of the first parked vehicle is recognized or determined, the parking control device may be configured to determine the overall width of the first parked vehicle based on the overall length of the first parked vehicle using the following equation, under the control of the processor.

$$y = 4E - 08x2 - 0.0004x + 1.4318 \qquad \text{[Equation]}$$

wherein the parameter "x" is the determined overall length of the first parked vehicle and the parameter "y" is the estimated overall width of a first parked vehicle.

The preset overall width (Y)/length(X) ratio may be determined in advance by a width-length proportional relationship by vehicle type based on statistics of vehicles produced up to the present time.

For example, a width/length value trend line by length for predicting a width by length may be represented as a graph shown in FIG. 5.

As described above, under the control of the processor, the parking control device may be configured to predict an overall width of a first parked vehicle by applying a determined overall length of the first parked vehicle to the preset ratio of overall width versus overall length of the first parked vehicle based on a first corner point and direction, and may thereby estimate a target parking space including a shape of the first parked vehicle in an area which is invisible from a currently traveling ego vehicle.

Figure 6:
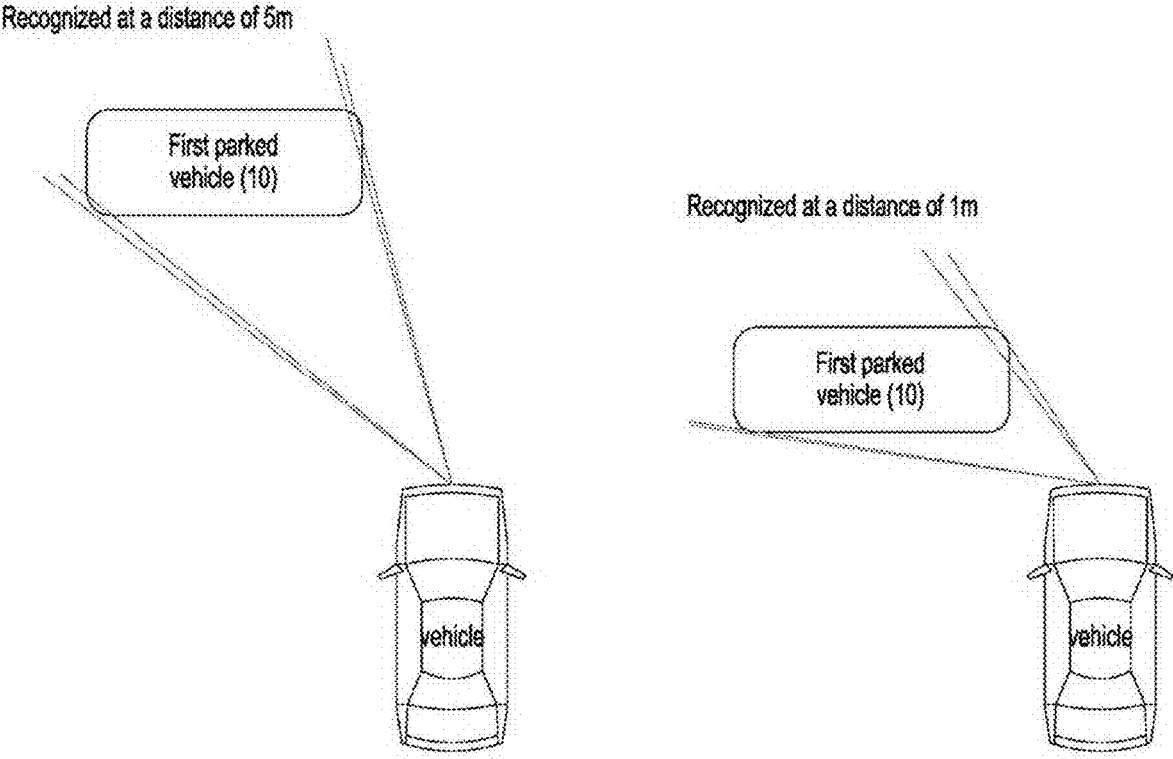
FIG. 6, FIG. 7A, FIG. 7B and FIG. 8 are diagrams illustrating a parking control method according to other embodiments of the present disclosure.
Figure 7:
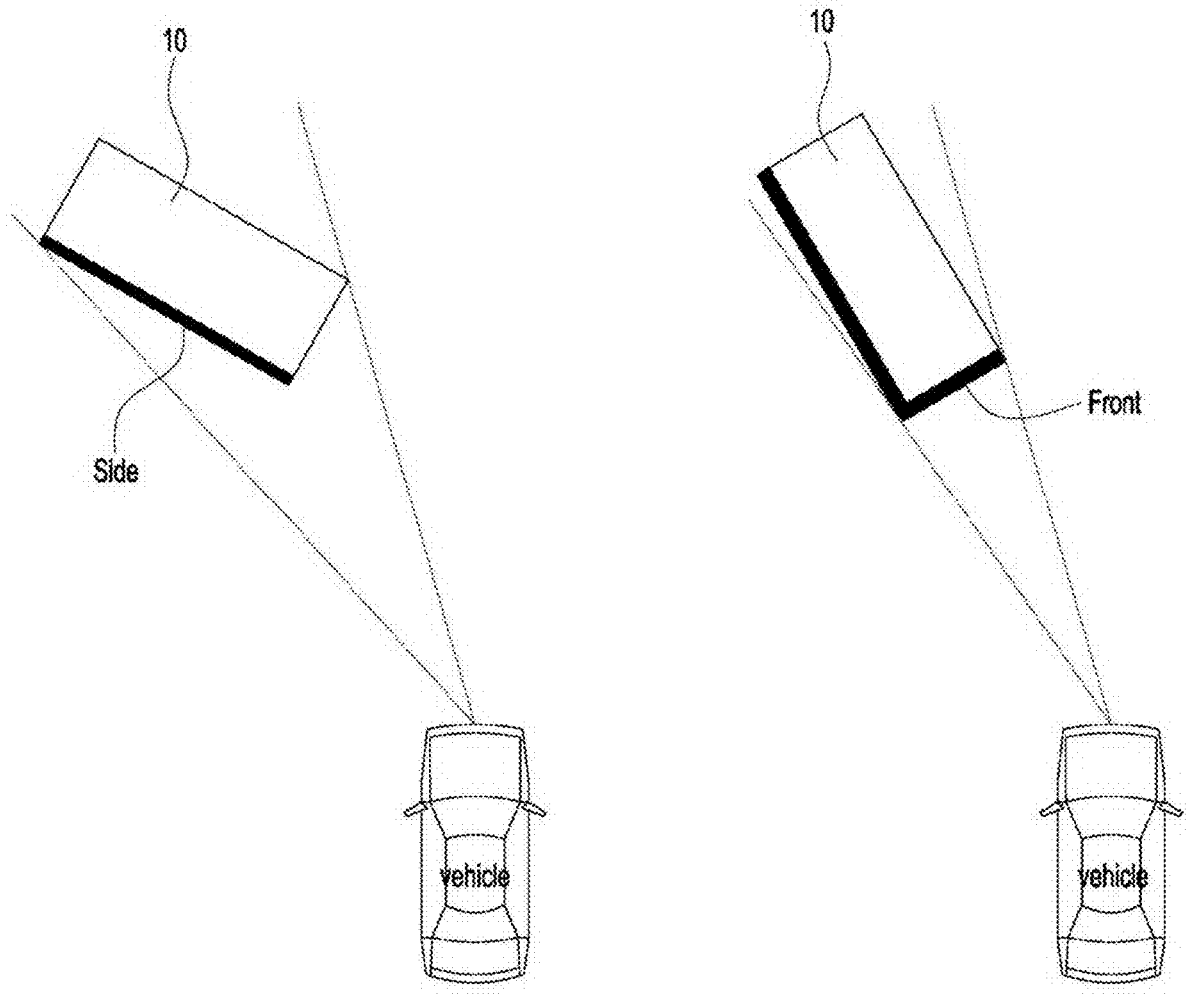
Figure 8:
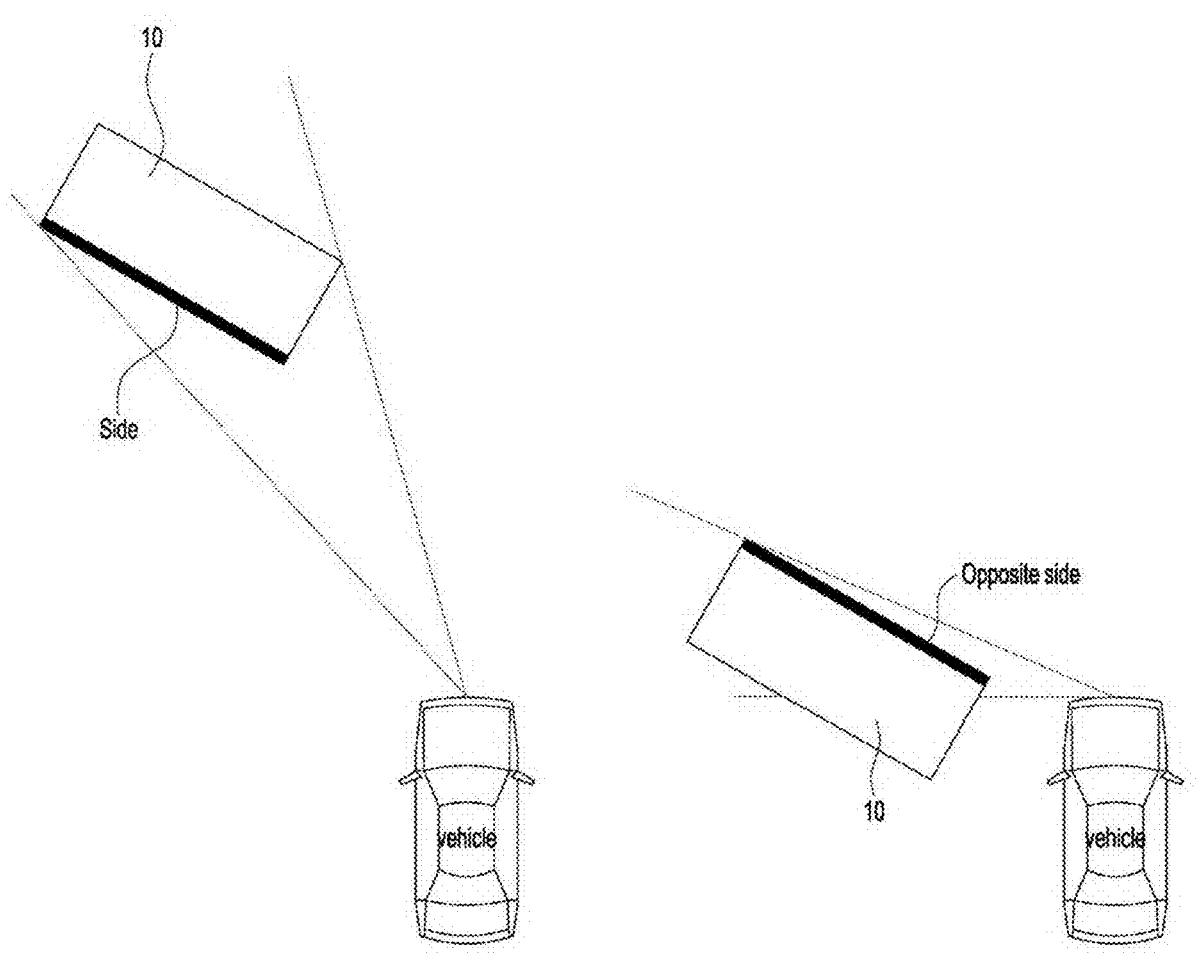

FIGS. 6 through 8 are diagrams illustrating a parking control method according to other embodiments of the present disclosure.

A forward diagonal parking type which is a third parking type among first to fourth parking types will be mainly described below with reference to FIGS. 6 through 8.

A parking control device according to another exemplary embodiment of the present disclosure may operate as follows. What has been described above with reference to FIG. 3 will be omitted from the following description provided below with reference to FIGS. 6 through 8.

As shown in FIGS. 6 through 8, in a case of a first parked vehicle 10 which is parked according to the forward diagonal parking type or a parking space where parking is made in such a way, the parking control device 100 may differently detect or estimate a side of the first parked vehicle based on a distance from an ego vehicle, under the control of the processor.

For example, as the distance between the ego vehicle and the first parked vehicle decreases gradually, the side of the first parked vehicle may become invisible and the front of the first parked vehicle may become visible. Accordingly, the parking control device may detect or estimate the side of the first parked vehicle and the front of the first parked vehicle.

In the instant case, when there is a second parked vehicle, the ego vehicle may detect or estimate a side of the second parked vehicle.

Furthermore, the ego vehicle may detect an opposite side of the first parked vehicle while passing the first parked vehicle.

In a case of size correction of the first parked vehicle which is parked according to the forward diagonal parking type or the forward diagonal parking space, the parking control device may estimate the size based on a distance step from the ego vehicle, under the control of the processor.

For example, when detecting the side of the first parked vehicle at a distance which is greater than a preset reference distance, the parking control device may be configured to determine an overall width of the first parked vehicle and estimate the size of the first parked vehicle using the determined overall width of the first parked vehicle, as described above with reference to FIG. 3A, FIG. 3B, FIG. 3C, FIG. 3D, and FIG. 3E, under the control of the processor. The preset reference distance may be approximately 5 m.

When the side of the first parked vehicle is detected at a distance greater than the preset reference distance, and a tilt of the side of the first parked vehicle is greater than a radiation angle of a LiDAR of the ego vehicle, the parking control device may detect the side of the first parked vehicle, under the control of the processor. For example, as shown in FIG. 7A and FIG. 7B, a case where the tilt of the side of the first parked vehicle is greater than the radiation angle of the LiDAR is indicated in bold line in FIG. 7A, and a case where the tilt of the side of the first parked vehicle is smaller than the radiation angle of the LiDAR is indicated in bold line in FIG. 7B.

Furthermore, when the distance from the ego vehicle decreases to be less than the preset reference distance, the parking control device may be configured to determine that, as a bumper of the first parked vehicle which is a target vehicle is more rounded, the first parked vehicle has more obscured area itself, although it depends on a shape of the bumper of the first parked vehicle, under the control of the processor.

Furthermore, when there is a first corner point and a first linear component, the parking control device may store the corresponding values of the first corner point and the first linear component, and use them when the ego vehicle approaches the first parked vehicle and the nearing side of the first parked vehicle becomes invisible, under the control of the processor.

Furthermore, as shown in FIG. 8, when the previously invisible side of the first parked vehicle becomes more visible and thus the size of the first parked vehicle is detected as being greater than the previously estimated or predicted size, the parking control device may update a corresponding value, under the control of the processor. That is, when the length of the first parked vehicle which is a target vehicle is greater due to the obstruction of the first parked vehicle itself, the parking control device may update the length, under the control of the processor.

In other words, when the opposite side of the first parked vehicle is detected while the ego vehicle is passing the first parked vehicle, the parking control device may update the size of the first parked vehicle and the tilt of the first parked vehicle to more recent values, under the control of the processor.

In the instant case, while passing the first parked vehicle may be defined as when the side of the first parked vehicle passes a boundary of a detection range of a LIDAR of the ego vehicle.

FIG. 9A, FIG. 9B, FIG. 9C and FIG. 9D are diagrams illustrating a parking control method according to another exemplary embodiment of the present disclosure.

Referring to FIG. 9A, FIG. 9B, FIG. 9C and FIG. 9D, under the control of the processor, the parking control device may obtain second contour information of a second parked vehicle which is parked apart from a first parked vehicle with a predetermined distance.

Under the control of the processor, the parking control device may identify a plurality of parking types for the second parked vehicle based on the second contour information and a current traveling direction of an ego vehicle, and may estimate a size of the second parked vehicle in response to one parking type selected among the plurality of parking types.

Under the control of the processor, the parking control device may explore a target parking space among parking spaces based on the size of the first parked vehicle and the size of the second parked vehicle.

Estimating the second contour information and the size of the second parked vehicle may be sufficiently inferred from what has been described above with reference to FIGS. 1 through 8, and a more detailed description thereof will be omitted.

When a part of the second contour information is not obtained for the second parked vehicle which is parked apart from the first parked vehicle by the predetermined distance, the parking control device may estimate the size of the second parked vehicle based on the first contour information and the parking type selected among the plurality of parking types for the first parked vehicle, under the control of the processor.

Figure 9:
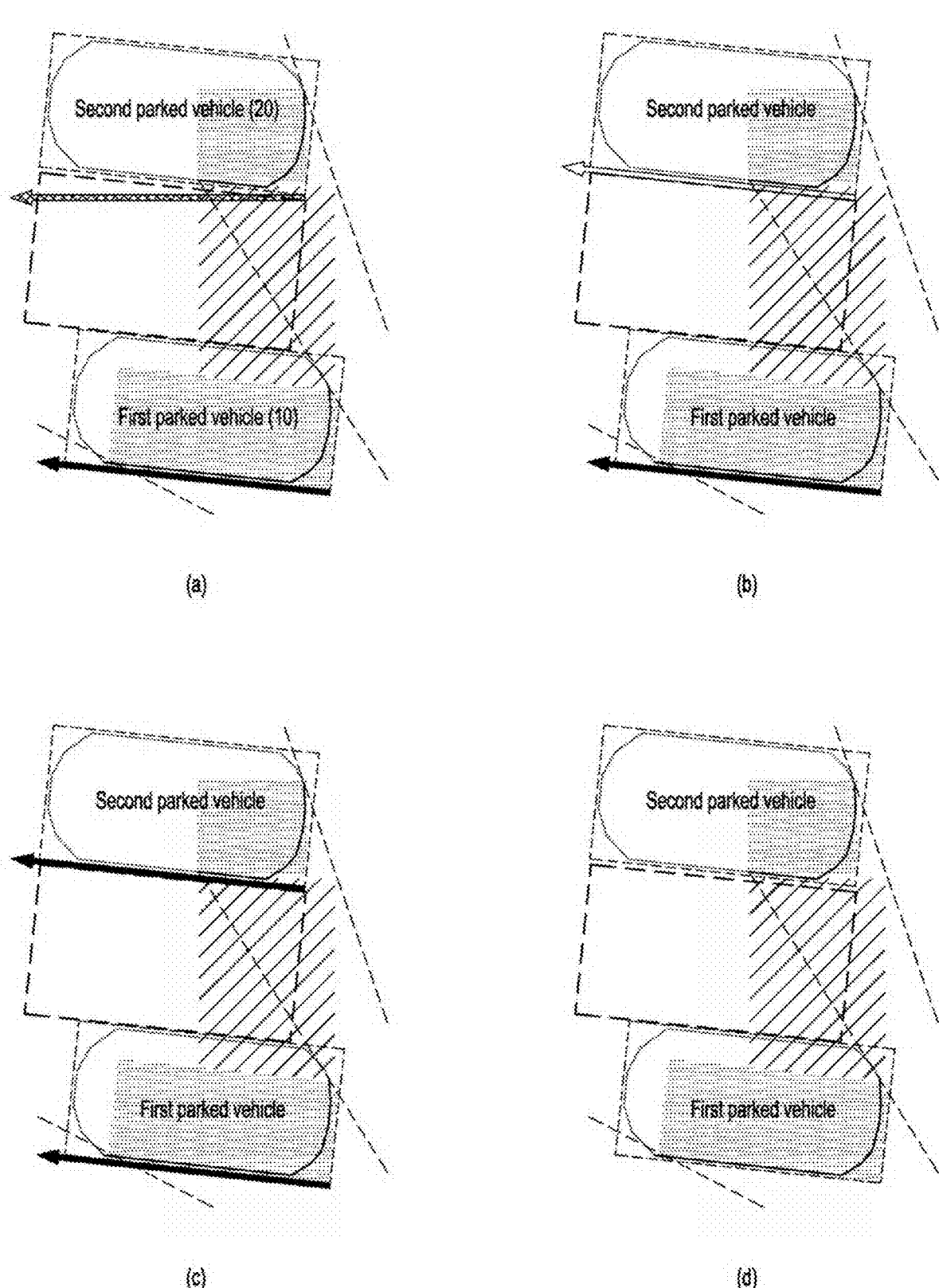
FIG. 9A, FIG. 9B, FIG. 9C and FIG. 9D are diagrams illustrating a parking control method according to another exemplary embodiment of the present disclosure.

As shown in FIG. 9A, there may be a case where a second parked vehicle which is parked in a parking space is obscured by a first parked vehicle, and thus there is no second linear component of the second parked vehicle and an accurate estimation of a tilt of the second parked vehicle and a size of the second parked vehicle is not possible.

As shown in FIG. 9B, when the first parked vehicle is in a direction closer to an ego vehicle than the second parked vehicle, and a distance from the second parked vehicle is a preset specific distance, the parking control device may use a tilt of the first parked vehicle and a linear segment (or an overall length) of the first parked vehicle to assign them to the tilt of the second parked vehicle and the linear segment (or an overall length) of the second parked vehicle, under the control of the processor. The preset specific distance may be set to 4 m, which is typically twice an overall vehicle width.

Furthermore, when the linear segment (or the length) of the second parked vehicle which is detected or recognized in the presence of an area obscured by the first parked vehicle is shorter than the linear segment (or the length) of the first parked vehicle, the parking control device may assign it as the linear segment (or the length) of the first parked vehicle, under the control of the processor.

In contrast, when the linear segment (or the length) of the second parked vehicle which is detected or recognized in the presence of an area obscured by the first parked vehicle is longer than the linear segment (or the length) of the first parked vehicle, the parking control device may use the linear segment (or the length) of the second parked vehicle, under the control of the processor, As shown in FIG. 9C, when estimating the tilt of the second parked vehicle becomes possible, the parking control device may assign a tilt estimated from the second parked vehicle as the tilt of the second parked vehicle, under the control of the processor. Such a state where the estimation of the tilt of the second parked vehicle is possible may be a state in which the side and the front of the second parked vehicle may be distinguished or identified by the ego vehicle, i.e., a state where the side with an overall width of 2 m or more may be detected.

As shown in FIG. 9D, when the obstruction by the first parked vehicle is removed and the linear segment (or the length) of the second parked vehicle becomes recognizable, the parking control device may assign a linear segment (or the length) estimated from the second parked vehicle to the linear segment (or the length) of the second parked vehicle, under the control of the processor.

Accordingly, when the side of the second parked vehicle becomes fully visible, the parking control device may be configured to determine the size of the second parked vehicle using the same method as the method of determining the size of the first parked vehicle described above.

Under the control of the processor, the parking control device may then explore a target parking space among parking spaces based on the size of the first parked vehicle and the size of the second parked vehicle.

As described above, under the control of the processor, the parking control device may be configured to determine a length of the target parking space and a width of the target parking space based on the first contour information or the second contour information obtained for the second parked vehicle.

Figure 10:
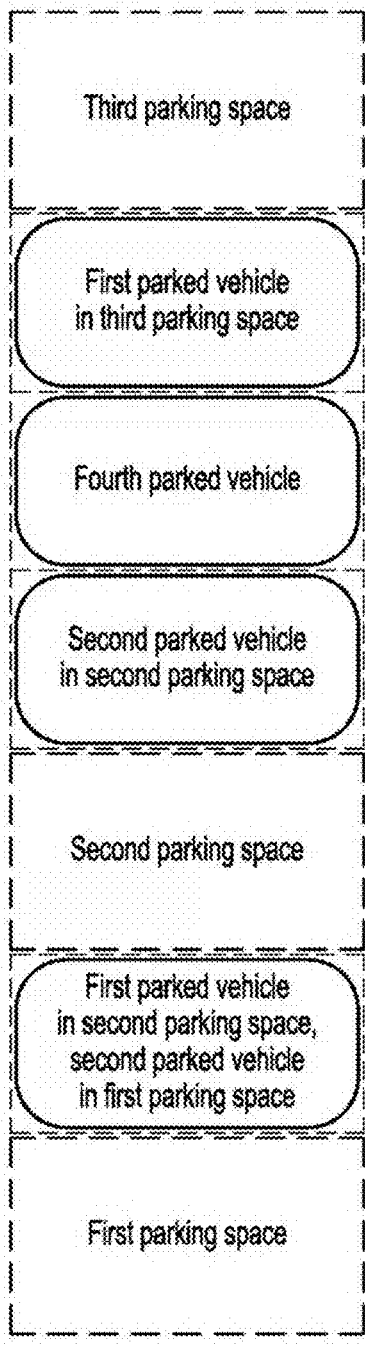
FIG. 10 is a diagram illustrating a method of exploring a parking space according to an exemplary embodiment of the present disclosure.

FIG. 10 is a diagram illustrating a method of exploring a parking space according to an exemplary embodiment of the present disclosure.

Referring to FIG. 10, a parking control device according to an exemplary embodiment of the present disclosure may perform parking space exploration based on a parked vehicle detected in a parking space. The parking space may be explored using contour information, which is information related to at least one parked vehicle adjacent to the parking space. The contour information has been described in detail above, and a more detailed description thereof will be omitted here.

For example, the parked vehicle adjacent to the parking space may include a first parked vehicle and a second parked vehicle.

In FIG. 10, the parking space may be defined as a between-vehicle parking space in the presence of both the first parked vehicle and the second parked vehicle, as a behind-vehicle parking space in the presence of only the first parked vehicle, and as a before-vehicle parking space in the presence of only the second parked vehicle.

For example, when a parked vehicle positioned at a distance less than a reference distance in a traveling direction of an ego vehicle is not recognized, based on a detected or recognized parked vehicle, the parking control device may recognize a corresponding space as a parking space and specify the recognized vehicle as the first parked vehicle, under the control of the processor.

Furthermore, when a parked vehicle positioned at a distance less than a reference distance in a direction opposite to the traveling direction of the ego vehicle, based on a detected or recognized parked vehicle, the parking control device may recognize a corresponding space as a parking space and specify the recognized vehicle as the second parked vehicle, under the control of the processor.

When the first parked vehicle and the second parked vehicle are specified as described above, the second parked vehicle in a first parking space and the first parked vehicle in a second parking space may be used, as shown in FIG. 10.

Furthermore, under the control of the processor, the parking control device may explore a parking space, using size information and tilt information of the first parked vehicle and the second parked vehicle. A reference point and a tilt may be set differently by parking type.

Furthermore, in a case of a parking space between parked vehicles (or the between-vehicle parking space), the parking control device may be configured to determine an average tilt of the parked vehicles to explore the parking space, under the control of the processor.

Furthermore, in a case of a parking space before a parked vehicle (or the before-vehicle parking space), the parking control device may be configured to determine a reference point and a tilt of the second parked vehicle to explore the parking space, under the control of the processor.

Furthermore, in a case of a parking space behind a parked vehicle (or the behind-vehicle parking space), the parking control device may be configured to determine a reference point and a tilt of the first parked vehicle to explore the parking space, under the control of the processor.

Furthermore, when exploring a parking space, the parking control device may first verify a size of the parking space in a longitudinal direction, under the control of the processor.

Furthermore, the parking control device may be configured to predict a length of the parking space based on an overall length of the first parked vehicle or the second parked vehicle which is an identified target vehicle and an overall length of the ego vehicle, under the control of the processor.

Furthermore, the parking control device may be configured to predict a width of the parking space in a width direction of the parking space based on the predicted length of the parking space, under the control of the processor.

The exemplary embodiments described above may be implemented in a form of a recording medium storing computer-executable instructions. The instructions may be stored in a form of program code, and when executed by the processor, may be configured to generate a program module to perform the operations described above. The recording medium may be implemented as a computer-readable recording medium.

The computer-readable medium includes all types of recording devices in which data readable by a computer system is stored. Examples of the computer-readable medium include a read-only memory (ROM), a random-access memory (RAM), a magnetic tape, a magnetic disk, a flash memory, an optical data non-transitory storage device, and the like.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling parking of a vehicle provided with a parking control device including a processor, the method comprising:

obtaining, by the processor, first contour information of a first parked vehicle which is parked in a parking space using sensor information obtained via a sensor module provided in the vehicle, wherein the sensor module includes at least one of an ultrasonic sensor, a radar, a camera, a laser scanner and/or a corner radar, a LiDAR, an acceleration sensor, a yaw rate sensor, a torque measurement sensor, or a wheel speed sensor;

identifying, by the processor, a plurality of parking types for the first parked vehicle based on the first contour information and a current traveling direction of the vehicle;

estimating, by the processor, a size of the first parked vehicle in response to a parking type selected among the plurality of parking types; and exploring, by the processor, a target parking space in the parking space based on the size of the first parked vehicle.

2. The method of claim 1, including:

obtaining, by the processor, second contour information of a second parked vehicle which is parked apart from the first parked vehicle;

identifying, by the processor, a plurality of parking types for the second parked vehicle based on the second contour information and the current traveling direction of the vehicle;

estimating, by the processor, a size of the second parked vehicle in response to a parking type selected among the plurality of parking types for the second parked vehicle; and exploring, by the processor, the target parking space in the parking space based on the size of the first parked vehicle and the size of the second parked vehicle.

3. The method of claim 1, including:

in response that a portion of second contour information is not obtained for a second parked vehicle which is parked apart from the first parked vehicle, estimating, by the processor, a size of the second parked vehicle based on the first contour information and the parking type selected among the plurality of parking types for the first parked vehicle; and exploring, by the processor, the target parking space in the parking space based on the size of the first parked vehicle and the size of the second parked vehicle.

4. The method of claim 1, wherein the first contour information includes:

a first linear segment extracted based on a side of the first parked vehicle;

a first corner point which is closest to the vehicle among corners of the first parked vehicle;

a tilt of the first parked vehicle, which is an angle formed between the first linear segment and the current traveling direction of the vehicle; and a center point of the first parked vehicle extracted through a first line perpendicular to the first linear segment.

5. The method of claim 4, including:

extracting, by the processor, a plurality of points becoming in contact with the first line by moving the first line to an outermost line of the first parked vehicle, and setting, by the processor, a centrally positioned point among the extracted plurality of points as the center point of the first parked vehicle.

6. The method of claim 5, including:

determining, by the processor, an overall width of the first parked vehicle, using the first corner point and the center point of the first parked vehicle.

7. The method of claim 6, including:

in response that the determined overall width of the first parked vehicle is out of a preset reference overall width range, extracting, by the processor, a license plate of the first parked vehicle from the sensor information, and determining, by the processor, the center point of the first parked vehicle using the extracted license plate of the first parked vehicle; and

re-determining, by the processor, the overall width of the first parked vehicle based on the determined center point of the first parked vehicle and the first corner point.

8. The method of claim 6, including:

in response that the determined overall width of the first parked vehicle is out of a preset reference overall width range, extracting, by the processor, a parking space marking line of the parking space from the sensor information, and determining, by the processor, the center point of the first parked vehicle using the extracted parking space marking line; and re-determining, by the processor, the overall width of the first parked vehicle based on the determined center point of the first parked vehicle and the first corner point.

9. The method of claim 4, including:

in response that the center point of the first parked vehicle is not extracted, determining, by the processor, an overall length of the first parked vehicle using the first linear segment; and estimating, by the processor, an overall width of the first parked vehicle by applying the determined overall length of the first parked vehicle to a preset ratio of the overall width versus the overall length.

10. The method of claim 1, wherein the target parking space is explored based on the first parked vehicle or a second parked vehicle which is parked in proximity to the target parking space, and wherein the method further includes:

determining, by the processor, a length and a width of the target parking space based on the first contour information or second contour information obtained for the second parked vehicle.

11. A parking control apparatus, provided in a vehicle and configured to control parking of the vehicle, the parking control apparatus comprising:

a processor configured to control the parking control apparatus, wherein the processor is configured to:

obtain first contour information of a first parked vehicle which is parked in a parking space, using sensor information obtained via a sensor module provided in the vehicle, wherein the sensor module includes at least one of an ultrasonic sensor, a radar, a camera, a laser scanner and/or a corner radar, a LiDAR, an acceleration sensor, a yaw rate sensor, a torque measurement sensor, or a wheel speed sensor;

identify a plurality of parking types for the first parked vehicle based on the first contour information and a current traveling direction of the vehicle;

estimate a size of the first parked vehicle in response to a parking type selected among the plurality of parking types for the first parked vehicle; and explore a target parking space in the parking space based on the size of the first parked vehicle.

12. The parking control apparatus of claim 11, wherein the processor is further configured to:

obtain second contour information of a second parked vehicle which is parked apart from the first parked vehicle;

identify a plurality of parking types for the second parked vehicle based on the second contour information and the current traveling direction of the vehicle;

estimate a size of the second parked vehicle in response to a parking type selected among the plurality of parking types for the second parked vehicle; and explore the target parking space in the parking space based on the size of the first parked vehicle and the size of the second parked vehicle.

13. The parking control apparatus of claim 11, wherein the processor is further configured to:

in response that a part of second contour information is not obtained for a second parked vehicle which is parked apart from the first parked vehicle, estimate a size of the second parked vehicle based on the first contour information and the parking type selected among the plurality of parking types for the first parked vehicle; and explore the target parking space in the parking space based on the size of the first parked vehicle and the size of the second parked vehicle.

14. The parking control apparatus of claim 11, wherein the first contour information includes:

a first linear segment extracted based on a side of the first parked vehicle;

a first corner point which is positioned closest to the vehicle among corners of the first parked vehicle;

a tilt of the first parked vehicle, which is an angle formed between the first linear segment and the current traveling direction of the vehicle; and a center point of the first parked vehicle extracted through a first line perpendicular to the first linear segment.

15. The parking control apparatus of claim 14, wherein the processor is further configured to:

extract a plurality of points becoming in contact with the first line by moving the first line to an outermost line of the first parked vehicle, and set a centrally positioned point among the extracted plurality of points as the center point of the first parked vehicle.

16. The parking control apparatus of claim 15, wherein the processor is further configured to:

determine an overall width of the first parked vehicle, using the first corner point and the center point of the first parked vehicle.

17. The parking control apparatus of claim 16, wherein the processor is further configured to:

in response that the determined overall width of the first parked vehicle is out of a preset reference overall width range, extract a license plate of the first parked vehicle from the sensor information, and determine the center point of the first parked vehicle using the extracted license plate of the first parked vehicle; and re-determine the overall width of the first parked vehicle based on the determined center point of the first parked vehicle and the first corner point.

18. The parking control apparatus of claim 16, wherein the processor is further configured to:

in response that the determined overall width of the first parked vehicle is out of a preset reference overall width range, extract a parking space marking line of the parking space from the sensor information, and determine the center point of the first parked vehicle using the extracted parking space marking line; and re-determine the overall width of the first parked vehicle based on the determined center point of the first parked vehicle and the first corner point.

19. The parking control apparatus of claim 14, wherein the processor is further configured to:

in response that the center point of the first parked vehicle is not extracted, determine an overall length of the first parked vehicle using the first linear segment; and estimate an overall width of the first parked vehicle by applying the determined overall length of the first parked vehicle to a preset ratio of the overall width versus the overall length.

20. The parking control apparatus of claim 11, wherein the target parking space is explored based on the first parked vehicle or a second parked vehicle which is parked in proximity to the target parking space, and wherein the processor is further configured to control to determine a length and a width of the target parking space based on the first contour information or second contour information obtained from the second parked vehicle.

* * * * *